United States Patent
Ishii et al.

(10) Patent No.: US 9,855,937 B2
(45) Date of Patent: Jan. 2, 2018

(54) MOTORCYCLE

(71) Applicant: Kawasaki Jukogyo Kabushiki Kaisha, Kobe-shi, Hyogo (JP)

(72) Inventors: Hiroshi Ishii, Kobe (JP); Tomo Yamamoto, Kobe (JP); Daisuke Saeki, Kakogawa (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 0 days.

(21) Appl. No.: 15/039,025

(22) PCT Filed: Nov. 29, 2013

(86) PCT No.: PCT/JP2013/007028
§ 371 (c)(1),
(2) Date: May 24, 2016

(87) PCT Pub. No.: WO2015/079478
PCT Pub. Date: Jun. 4, 2015

(65) Prior Publication Data
US 2017/0036653 A1 Feb. 9, 2017

(51) Int. Cl.
*B60T 8/34* (2006.01)
*B62L 3/02* (2006.01)
(Continued)

(52) U.S. Cl.
CPC .......... *B60T 8/344* (2013.01); *B60T 8/3685* (2013.01); *B62K 11/04* (2013.01); *B62K 11/14* (2013.01);
(Continued)

(58) Field of Classification Search
CPC ......... B60T 7/08; B60T 8/1706; B60T 8/3685
See application file for complete search history.

(56) References Cited

U.S. PATENT DOCUMENTS 7,661,502 B2 * 2/2010 Miki .................. B60T 7/08
180/219
7,942,484 B2 * 5/2011 Yamakura ............ B60T 8/3225
303/137

(Continued)

FOREIGN PATENT DOCUMENTS

EP 1580107 A1 9/2005
JP H02128951 U1 10/1990
(Continued)

OTHER PUBLICATIONS

ISA Japanese Patent Office, International Search Report Issued in Application No. PCT/JP2013/007028, dated Jan. 7, 2014, WIPO, 4 pages.
(Continued)

*Primary Examiner* — Kevin Hurley
(74) *Attorney, Agent, or Firm* — Alleman Hall Creasman & Tuttle LLP (57) ABSTRACT

Provided is a motorcycle which can provide a space inside a main frame to place other members therein, and make it difficult for an outside impact to be transmitted to a hydraulic unit. A motorcycle comprises a head pipe which supports a rotary shaft around which a handle is rotatable with respect to a vehicle body; a pair of right and left main frames extending in a forward and rearward direction from the head pipe; and a hydraulic unit mounted to one of the pair of right and left main frames, wherein the pair of right and left main frames have increased-space portions, which define a space with a dimension increasing in an obliquely rearward direction from the head pipe toward maximum-space portions of the main frames, and wherein the hydraulic unit is mounted to an outer portion of the increased-space portion of one of the main frames.

9 Claims, 5 Drawing Sheets

(51) Int. Cl.
  *B62K 11/04* (2006.01)
  *B62K 19/38* (2006.01)
  *B60T 8/36* (2006.01)
  *B62K 11/14* (2006.01)
  *B60T 8/17* (2006.01)

(52) U.S. Cl.
  CPC .............. *B62K 19/38* (2013.01); *B62L 3/023* (2013.01); *B60T 8/1706* (2013.01)

(56) References Cited

U.S. PATENT DOCUMENTS

| | | | | |
|---|---|---|---|---|
| 8,002,066 | B2* | 8/2011 | Harada | B60T 8/3685 180/219 |
| 8,444,164 | B2* | 5/2013 | Mikura | B60B 27/0068 280/279 |
| 9,150,276 | B2* | 10/2015 | Niimi | B62L 3/00 |
| 2015/0042062 | A1* | 2/2015 | Takatsuka | B62K 21/02 280/264 |

FOREIGN PATENT DOCUMENTS

| | | |
|---|---|---|
| JP | 2008087541 A | 4/2008 |
| JP | 2010234906 A | 10/2010 |
| JP | 4680162 B | 5/2011 |
| JP | 2012202869 A | 10/2012 |

OTHER PUBLICATIONS

ISA Japanese Patent Office, Written Opinion of the International Searching Authority Issued in Application No. PCT/JP2013/007028, dated Jan. 7, 2014, WIPO, 4 pages.

European Patent Office, Extended European Search Report Issued in European Application No. 13898198.0, dated Aug. 22, 2017, Germany, 9 pages.

* cited by examiner

MOTORCYCLE

TECHNICAL FIELD

The present invention relates to a motorcycle incorporating a hydraulic unit such as an anti-lock braking system (ABS) unit.

BACKGROUND ART

It is known that a motorcycle includes an electric control device which electrically controls a brake such as an ABS unit to assist braking. This electric control device includes a hydraulic unit which electrically controls an activation hydraulic pressure (oil pressure) applied to the brake. Patent Literature 1 discloses the exemplary layout of the hydraulic unit. According to a configuration disclosed in Patent Literature 1, the hydraulic unit is placed in a maximum-space portion of a front cowling, at a location that is rearward relative to a head pipe and outward relative to a main frame.

CITATION LIST

Patent Literature

Patent Literature 1: Japanese Patent Publication No. 4680162

SUMMARY OF INVENTION

Technical Problem

However, in the above-described configuration, since the hydraulic unit is located outward relative to the maximum-space portion of the main frame, an outside impact tends to be applied to the hydraulic unit when the motorcycle falls. As a solution to this, the above-described Patent Literature 1 discloses that a protection frame is additionally provided to protect the hydraulic unit. Since the protection frame is additionally provided outside the main frame in this way, it becomes necessary to increase the dimension of a gap formed between the frame and the front cowling, which increases the size of the motorcycle.

The present invention is directed to solving the above-described problem, and an object of the present invention is to provide a motorcycle which can have a space inside the main frames to place other members therein, and make it difficult for an outside impact to be transmitted to the hydraulic unit.

Solution to Problem

According to a first aspect of the present invention, a motorcycle comprises a head pipe which supports a rotary shaft around which a handle is rotatable with respect to a vehicle body in such a manner that the rotary shaft is rotatable; a pair of right and left main frames extending in a forward and rearward direction from the head pipe; and a hydraulic unit mounted to one of the pair of right and left main frames, wherein the pair of right and left main frames have increased-space portions, which define a space with a dimension increasing in an obliquely rearward direction from the head pipe toward maximum-space portions of the main frames, which define a space with a greatest dimension, and wherein the hydraulic unit is mounted to an outer portion of the increased-space portion of one of the main frames.

In accordance with this configuration, it becomes possible to provide the space inside the main frames to place other members therein, and to place the hydraulic unit so as to make it difficult for an outside impact to be transmitted to the hydraulic unit.

The hydraulic unit may be placed in such a manner that a whole of the hydraulic unit or a center of gravity of the hydraulic unit is located in a placement space that is inward relative to a virtual line extending in the forward and rearward direction along an outer edge of one of the maximum-space portions. This configuration can make it difficult for an outside impact to be transmitted to the hydraulic unit.

The hydraulic unit may include a connection port connecting a hydraulic pipe to the hydraulic unit, and the connection port may be placed in such a manner that the connection port is located in a placement space that is inward relative to a virtual line extending in the forward and rearward direction along an outer edge of one of the maximum-space portions. This configuration can make it difficult for an outside impact to be transmitted to the connection port of the hydraulic unit.

The hydraulic unit may be placed in the increased-space portion and located radially outward relative to a rotation track of a front fork placed between the handle and a front wheel, around the rotary shaft. In accordance with this configuration, a steering angle of the handle is not limited by the hydraulic unit.

When viewed from above, the hydraulic unit may be placed to overlap with the handle while the motorcycle is traveling straight ahead, and may be placed below the handle to be spaced apart from the handle. In accordance with this configuration, the hydraulic unit can be placed close to the head pipe without impeding the rotation of the handle. This allows the hydraulic unit to be located to be as close to the center of the vehicle body of the motorcycle in the vehicle width direction as possible.

At least one of the pair of right and left main frames may be provided with a through-hole extending in a vehicle width direction, and the hydraulic pipe connected to the hydraulic unit may be placed to extend from outside one of the pair of right and left main frames into a space formed between the pair of right and left main frames, through the through-hole. In accordance with this configuration, the hydraulic pipe is introduced into the space formed between the main frames and thereby protected. In addition, since it is not necessary to place the hydraulic pipe at a location that is above or below the main frames, the hydraulic pipe can be shortened, and a degree with which the hydraulic pipe is curved can be reduced.

The motorcycle may comprise: a radiator which cools a coolant, and the hydraulic unit may be located above the radiator. In accordance with this configuration, since the hydraulic unit is placed to avoid interfering with the radiator in the forward and rearward direction, the hydraulic unit is less affected by heat generated in the radiator.

The motorcycle may comprise a brake disc which is fastened to a wheel member constituting a wheel in such a manner that the brake disc is unrotatable with respect to the wheel member; and a vehicle speed sensor unit which detects a speed of the wheel and transmits the detected speed to the hydraulic unit, wherein the hydraulic unit may be configured to control a braking force based on a signal received from the vehicle speed sensor unit, wherein the vehicle speed sensor unit may include: a vehicle speed sensor body fastened to the vehicle body to which the wheel is rotatably mounted, and a vehicle speed sensor rotor plate which is fastened to the wheel member in such a manner that the vehicle speed sensor rotor plate is unrotatable with respect to the wheel member; and wherein the brake disc and the vehicle speed sensor rotor plate may be placed to be radially spaced apart from each other over an entire circumference of a rotary shaft of the wheel. In accordance with this configuration, the brake disc and the rotor plate are not in direct contact with each other. This configuration makes it difficult for heat generated by friction at the brake disc to be transferred to the rotor plate. Therefore, it becomes possible to prevent an expansion or a distortion of the rotor plate which measures the vehicle speed, due to the heat. As a result, lower accuracy of measurement of the vehicle speed, which may be caused by the heat, does not occur.

The above and further objects, features and advantages of the present invention will more fully be apparent from the following detailed description of preferred embodiment with reference to accompanying drawings.

Advantageous Effects of Invention

The present invention is configured as described above, and can obtain an advantage that it becomes possible to provide a space inside main frames to place other members therein, and make it difficult for an outside impact to be transmitted to a hydraulic unit.

DESCRIPTION OF EMBODIMENTS

Hereinafter, the embodiment of the present invention will be described with reference to the drawings. Throughout the drawings, the same or corresponding components are designated by the same reference symbols and will not be described repeatedly. The directions stated below are from the perspective of a rider straddling the motorcycle.

Figure 1:
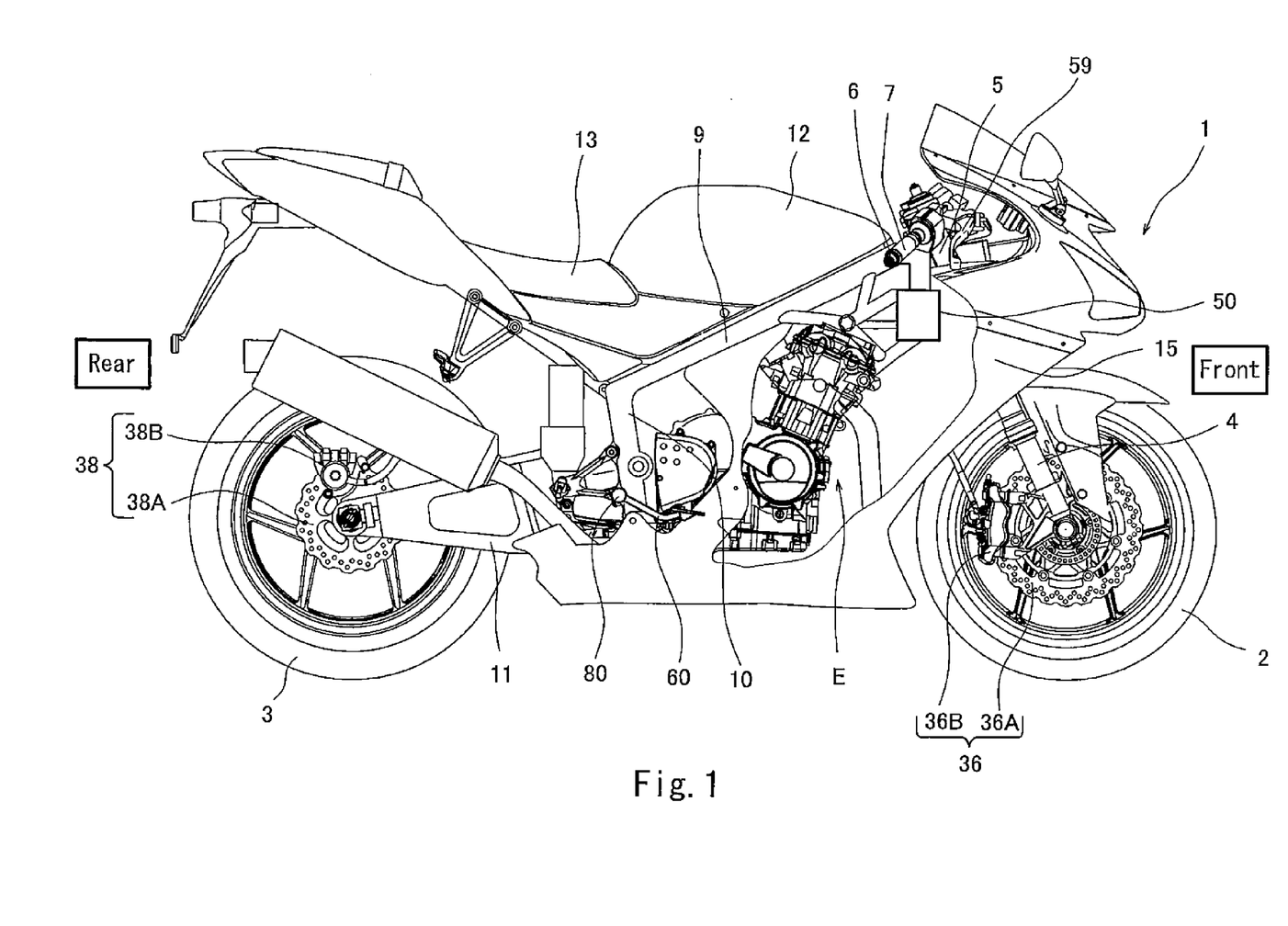
FIG. 1 is a right side view showing a motorcycle according to the embodiment of the present invention.

FIG. 1 is a right side view showing a motorcycle according to the embodiment of the present invention. As shown in FIG. 1, a motorcycle 1 includes a front wheel 2 and a rear wheel 3 which roll on a road surface. The rear wheel 3 is a drive wheel, and the front wheel 2 is a driven wheel. The front wheel 2 is rotatably mounted to the lower end portion of a front fork 4 extending substantially vertically. In the present embodiment, the front wheel 2 is mounted to a pair of right and left front forks 4. The front forks 4 are supported on a steering shaft (not shown) via an upper bracket (not shown) provided at the upper end portions of the front forks 4 and an under bracket (not shown) provided below the upper bracket. The steering shaft is rotatably supported by a head pipe 5. A bar-type handle 6 extending in a rightward and leftward direction is attached to the upper bracket. Front wheel brake discs 36A are fastened to the right and left portions of the front wheel 2, respectively. Front wheel brake calipers 36B are attached to the lower end portions of the front forks 4, respectively. The front wheel brake discs 36A and the front wheel brake calipers 36B constitute a front wheel brake 36. A piston (not shown) of each of the front wheel brake calipers 36B is pressed against the front wheel brake disc 36A by a hydraulic pressure (oil pressure), and thus a braking force is generated.

A throttle grip 7 attached on a portion of the handle 6, which is to be gripped by the rider's right hand, is a throttle input device operated to operate a throttle device (not shown). A brake lever 59 is placed in front of the throttle grip to activate the front wheel brake 36. A clutch lever 8 (see FIG. 2) is placed in front of the left grip of the handle 6. The rider rotates the handle 6 to change the direction of the front wheel 2 into a desired direction around the steering shaft as a rotary shaft.

A pair of right and left main frames 9 extend rearward from the head pipe 5 in such a manner that the main frames 9 are inclined in a downward direction. A hydraulic unit 50 is mounted to one of the pair of right and left main frames 9 (in the present embodiment, the right main frame 9). The hydraulic unit 50 is placed inside the front cowling 15 which partially covers the motorcycle 1 from the front.

A pair of right and left pivot frames 10 are connected to the rear portions of the main frames 9, respectively. The front end portion of a swing arm 11 extending substantially in a forward and rearward direction is mounted to the pivot frames 10. The rear wheel 3 is rotatably mounted to the rear end portion of the swing arm 11. A fuel tank 12 is placed rearward relative to the handle 6. A seat 13 straddled by the rider is placed rearward relative to the fuel tank 12. A rear wheel brake disc 38A is fastened to the right portion of the rear wheel 3. A rear wheel brake caliper 38B is mounted to the rear end portion of the swing arm 11. The rear wheel brake disc 38A and the rear wheel brake caliper 38B constitute a rear wheel brake 38. A piston (not shown) of the rear wheel brake caliper 38B is pressed against the rear wheel brake disc 38A by a hydraulic pressure (oil pressure), and thus a braking force is generated. Foot rests 80 on which the rider's feet rest are provided on the right and left sides of the seat 13, at locations that are below the seat 13. A brake pedal 60 extending forward is pivotally mounted to the right foot rest 80. The rider depresses the brake pedal 60 to primarily activate the rear wheel brake 38.

Between the front wheel 2 and the rear wheel 3, an engine E is mounted to the main frames 9 and the pivot frames 10. In the example of FIG. 1, an inline four-cylinder engine is shown as the engine E. A transmission (not shown) is connected to the output shaft of the engine E. Driving power output from the transmission is transmitted to the rear wheel 3 via a chain (not shown). The throttle device is placed inward relative to the main frames 9 and connected to the intake ports of the engine E. An air cleaner is placed below the fuel tank 12 and connected to the upstream portion of the throttle device. In an inner space formed below the seat 13, an engine ECU (electric control unit (not shown)) which is an engine control device which controls the throttle device, an ignition device, a fuel injection device, etc., the ignition device, an injector, and a battery (not shown) which supplies electric power to the ECU or the like, are accommodated.

Between the front wheel 2 and the rear wheel 3, an engine E is mounted to the main frames 9 and the pivot frames 10. In the example of FIG. 1, an inline four-cylinder engine is shown as the engine E. A transmission (not shown) is connected to the output shaft of the engine E. Driving power output from the transmission is transmitted to the rear wheel 3 via a chain (not shown). The throttle device is placed inward relative to the main frames 9 and connected to the intake ports of the engine E. An air cleaner is placed below the fuel tank 12 and connected to the upstream portion of the throttle device. In an inner space formed below the seat 13, an engine electronic control unit (ECU (not shown)) which is an engine control device which controls the throttle device, an ignition device, a fuel injection device, etc., the ignition device, an injector, and a battery (not shown) which supplies electric power to the ECU or the like, are accommodated.

The hydraulic unit 50 includes a front wheel oil pump and a rear wheel oil pump which are connected to a braking motor. Between the front wheel oil pump and a front wheel brake master cylinder which converts the operation amount of the front wheel brake caliper 36B and the operation amount of the brake lever 59 into the hydraulic pressure, a front wheel hydraulic pipe which can transmit the activation hydraulic pressure is provided. In the same manner, between the rear wheel oil pump and a rear wheel brake master cylinder which converts the operation amount of the rear wheel brake caliper 38B and the operation amount of the brake pedal 60 into the hydraulic pressure, a rear wheel hydraulic pipe which can transmit the activation hydraulic pressure is provided. The braking motor is controlled by the electric braking ECU, and thus the activation hydraulic pressure discharged from the front wheel oil pump and the activation hydraulic pressure discharged from the rear wheel oil pump are adjusted. In this configuration, the braking force of the front wheel 2 and the braking force of the rear wheel 3 can be controlled simultaneously. A control operation for the hydraulic unit 50 is not particularly limited, and may be a control operation different from that described in the present embodiment.

In the present embodiment, the hydraulic unit 50 includes the electric braking ECU, the braking motor, the oil pumps, control valves controlled by the electric braking ECU, etc.

Figure 2:
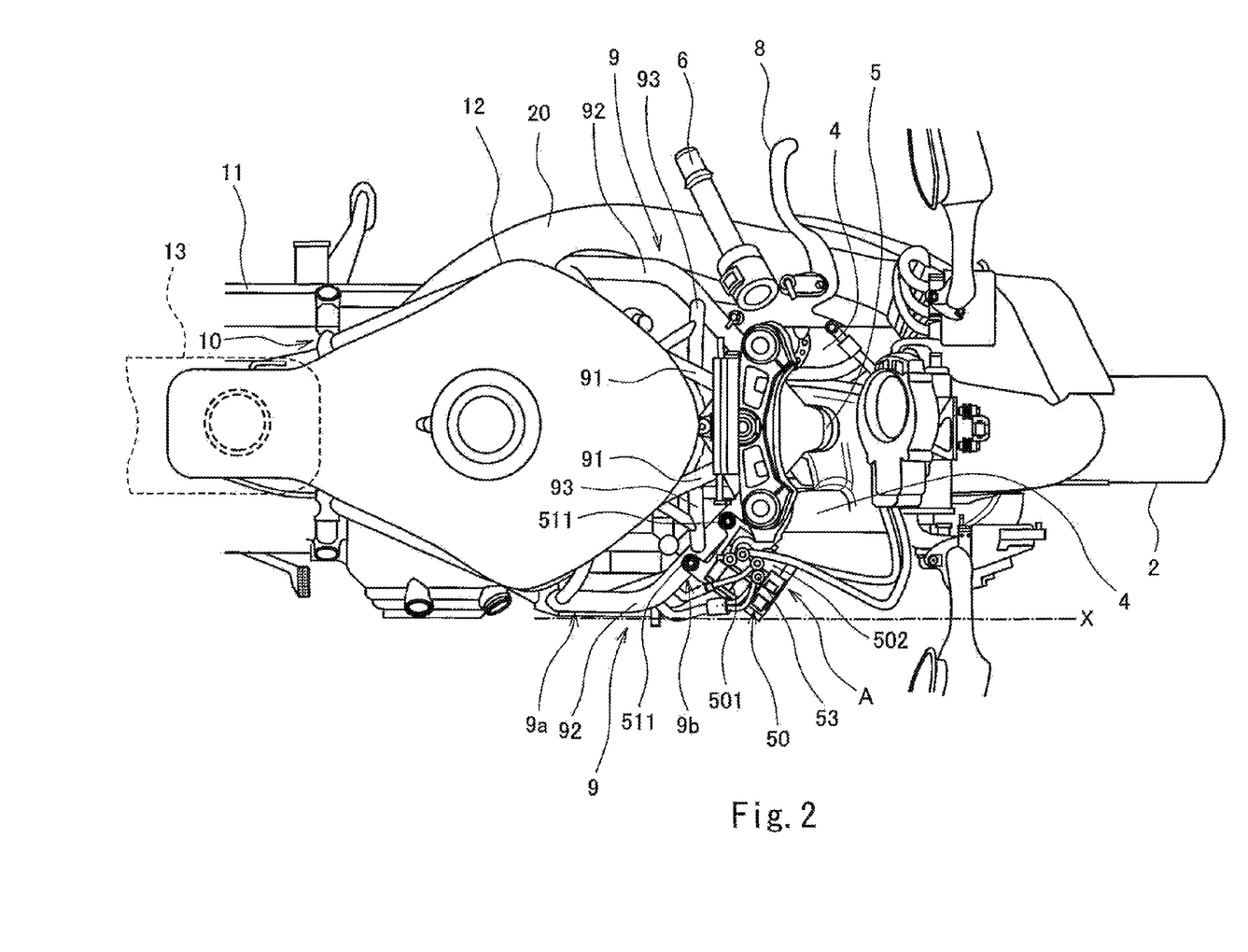
FIG. 2 is a partial plan view schematically showing the exemplary layout of members which are in the vicinity of a handle of the motorcycle according to the embodiment.
Figure 3:
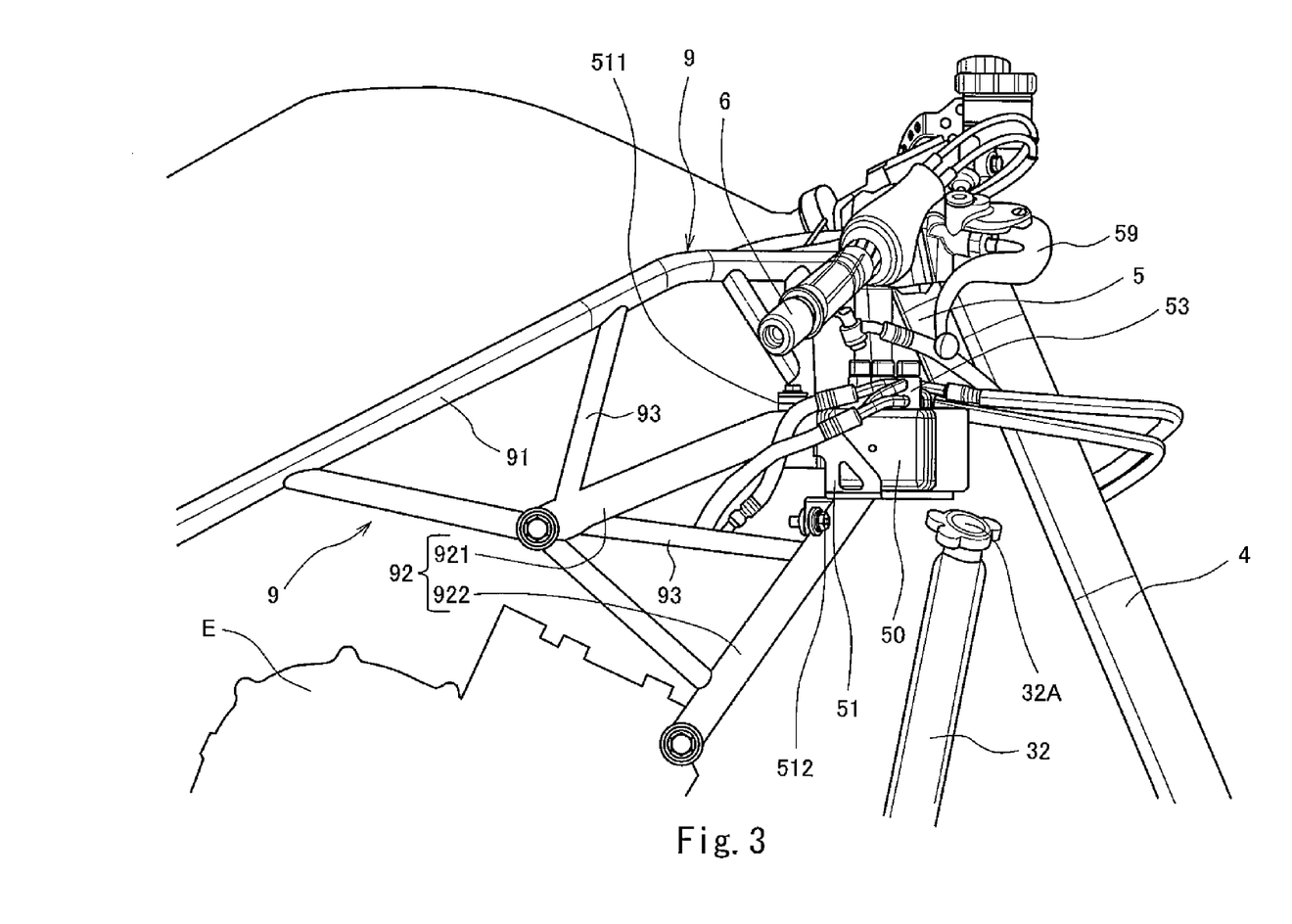
FIG. 3 is a partial right side view schematically showing the exemplary layout of members which are in the vicinity of the handle of the motorcycle according to the embodiment.
Figure 4:
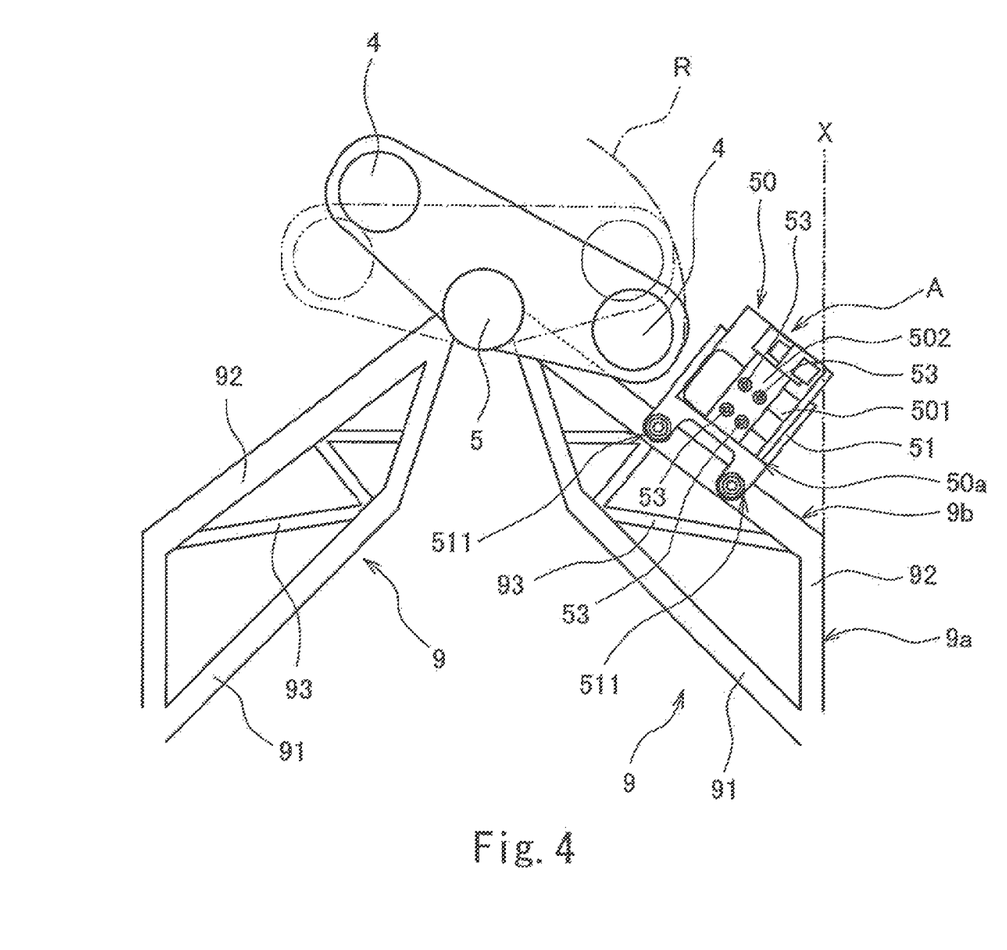
FIG. 4 is a partial plan view showing a relationship between a hydraulic unit and the rotation track of a front fork, in the motorcycle according to the embodiment.

Hereinafter, the layout of the hydraulic unit 50 will be more specifically described. FIG. 2 is a partial plan view schematically showing the exemplary layout of members which are in the vicinity of the handle of the motorcycle according to the embodiment. FIG. 3 is a partial right side view schematically showing the exemplary layout of members which are in the vicinity of the handle of the motorcycle according to the embodiment. FIG. 4 is a partial plan view showing a relationship between the hydraulic unit and the rotation track of the front fork, in the motorcycle according to the embodiment. In FIGS. 2, 3, and 4, the constituents other than the major components which will be described below, are not shown.

The pair of right and left main frames 9 have increased-space portions 9b, which define a space with a dimension increased in an obliquely rearward direction from the head pipe 5 toward maximum-space portions 9a of the main frames 9, which define a space with a greatest dimension. The hydraulic unit 50 is mounted to the outer portion of the increased-space portion 9b of the main frame 9.

In accordance with this configuration, the hydraulic unit 50 is mounted to the outer portion of the main frame 9 at a location that is rearward relative to the head pipe 5 and inward in the vehicle width direction relative to the maximum-space portion 9a of the main frame 9. In this layout, a space in which other members are placed can be formed inside the main frames 9 and below the seat 13. Since the hydraulic unit 50 is mounted to the increased-space portion 9b, it becomes possible to reduce the amount of the hydraulic unit 50 which protrudes outward from the main frame 9. In this configuration, the frame contacts an obstacle before the hydraulic unit 50 contacts the obstacle, for example, when the motorcycle 1 falls. Thus, the hydraulic unit 50 is positioned in such a manner that an outside impact is not easily transmitted to the hydraulic unit 50. In particular, the hydraulic unit 50 is positioned so that the hydraulic unit 50 does not contact a ground surface via the front cowling 15, even when the motorcycle 1 falls in a state in which the handle 6 is tilted to a maximum degree in any direction. In other words, when the motorcycle 1 falls, the handle 6 or the main frame 9 contacts the ground surface, before the hydraulic unit 50 contacts the ground surface. Further, since the hydraulic unit 50 is located to be close to the front wheel brake master cylinder, the hydraulic pipe extending between the hydraulic unit 50 and the front wheel brake master cylinder can be shortened. Therefore, a responsiveness of the front wheel brake 36, which is more important to the motorcycle 1, can be improved.

This will be explained in more detail. In the present embodiment, the hydraulic unit 50 is placed on a first side (right side) in the vehicle width direction, of the pair of right and left main frames 9. An air-intake pipe 20 and a harness for electric components are placed on a second side (left side) in the vehicle width direction, of the pair of right and left main frames 9. The hydraulic unit 50 is placed on an opposite side of the electric components such as a regulator and a generator, which generate an electromagnetic noise, with respect to the center line of the vehicle body in the vehicle width direction.

Each of the pair of right and left main frames 9 includes an upper frame 91 and a lower frame 92. The upper frame 91 and the lower frame 92 are connected to each other via one or a plurality of gusset member(s) 93. More specifically, each of the pair of right and left main frames 9 has a truss structure including a plurality of frame members which are combined in a triangular shape. In this configuration, the pair of right and left main frames 9 have through-holes extending in the vehicle width direction.

The lower frame 92 includes a first frame 921 and a second frame 922 placed below the first frame 921. The first frame 921 and the second frame 922 are connected to each other via one or a plurality of gusset member(s) 93. The maximum-space portion 9a of the main frame 9 is defined by the lower frame 92. More specifically, when viewed from above, the lower frame 92 has a shape in which the lower frame 92 protrudes farther outward in the vehicle width direction than the upper frame 91 does. An angle of the increased-space portion 9b with respect to the forward and rearward direction of the main frame 9 is determined based on the maximum steering angle of the handle 6. More specifically, the increased-space portion 9b has a shape in which the main frame 9 does not interfere with the handle 6 in a state in which the handle 6 is rotated to a greatest degree.

The hydraulic unit 50 is fastened to the outer portion of the lower frame 92 via a bracket 51. The bracket 51 includes first fastening sections 511 (see FIG. 2) used to fasten the hydraulic unit 50 to the upper surface of the first frame 921 by use of fastener members such as bolts, and a second fastening section 512 (see FIG. 3) used to fasten the hydraulic unit 50 to a mounting member provided at the second frame 922 by use of a fastener member such as a bolt. In the present embodiment, the first fastening sections 511 are fastened to the first frame 921 by two fastener members arranged in the forward and rearward direction, while the second fastening section 512 is fastened to the second frame 922 by use of one fastener member. The front first fastener section 511 is placed inward in the vehicle width direction relative to the rear first fastening section 511. The inner side surface of the hydraulic unit 50 in the vehicle width direction and the outer side surface of the hydraulic unit 50 in the vehicle width direction extend in parallel with a virtual line connecting the two first fastening sections 511 to each other. This allows the hydraulic unit 50 to be positioned at a more inward location in the vehicle width direction.

The hydraulic unit 50 includes an ECU accommodating section 501 in which an electric braking ECU (not shown) is accommodated, and a hydraulic system accommodating section 502 in which the components such as valves provided in paths through which the oil flows, the oil pumps and the braking motor are accommodated, and has a structure in which the ECU accommodating section 501 and the hydraulic system accommodating section 502 are integrated with each other. The hydraulic system accommodating section 502 is placed inward in the vehicle width direction relative to the ECU accommodating section 501 and in front of the ECU accommodating section 501 in the forward and rearward direction. Since the hydraulic system accommodating section 502 is located inward in the vehicle width direction relative to the ECU accommodating section 501, the hydraulic system such as the oil pump and the like can be easily protected even when the hydraulic unit 50 collides against an obstacle. The braking motor is placed inward in the vehicle width direction relative to the hydraulic system accommodating section 502 and in front of the hydraulic system accommodating section 502 in the forward and rearward direction. At least the outer side surface in the vehicle width direction and upper surface, of the hydraulic unit 50, are covered by an inner cover (not shown).

The configuration of the hydraulic unit 50 is not limited to the above-described configuration. The hydraulic unit 50 includes at least one of the oil pumps (electric pump), a container which contains accumulated brake oil therein, a part provided with the control valve, and a part provided with the braking ECU. In the present embodiment, these components are integrated with each other as described above. However, these components may be separate from each other. Further, a hydraulic unit for front wheel braking and a hydraulic unit for rear wheel braking may be separately provided. In this case, it is sufficient that at least one of the hydraulic units is placed within a placement space A.

The hydraulic unit 50 includes a corner portion formed by two outer side surfaces. This corner portion is located within the above-described placement space A. In the present embodiment, when viewed from above, at the outer end in the vehicle width direction, of the side (side which is substantially parallel to the first frame 921 and close to the first frame 921) of the hydraulic unit 50 to which the first fastening sections 511 are mounted, a corner portion 50a is formed by the two outer side surfaces of the ECU accommodating section 501. This corner portion 50a is located within the placement space A. In a case where the corner portion is provided at the inner end in the vehicle width direction, of the side of the hydraulic unit 50 to which the first fastening sections 511 are mounted, only the corner portion may be located within the placement space A. In summary, since at least one corner portion formed by the two outer side surfaces perpendicular to a horizontal plane is located within the placement space A, the hydraulic unit 50 can be positioned at a more inward location in the vehicle width direction.

The bracket 51 supporting the hydraulic unit 50 includes a body having a rectangular shape when viewed from above, except the fastening sections 511, 512. The bracket 51 is mounted to the hydraulic unit 50 in such a manner that one side (the side to which the first fastening sections 511 are mounted) of the rectangular shape conforms to the lengthwise direction of the increased-space portion 9b of the main frame 9. Since the hydraulic unit 50 is placed efficiently in this way, the whole of the hydraulic unit 50 can be accommodated at a location that is inward in the vehicle width direction relative to the maximum-space portion 9a of the main frame 9.

As shown in FIG. 4, in the increased-space portion 9b of the main frame 9, the hydraulic unit 50 is placed radially outward relative to a rotation track R of the front fork 4 placed between the handle 6 and the front wheel 2, around the rotary shaft (namely, center axis of the head pipe 5). In this configuration, the steering angle of the handle 6 is not limited by the hydraulic unit 50. In addition, the front side surface of the hydraulic unit 50 in the forward and rearward direction, which is placed in the increased-space portion 9b of the main frame 9, extends substantially in parallel with the tangential direction of the rotation track R of the front fork 4. Therefore, the hydraulic unit 50 can be placed at a location that is inward in the vehicle width direction, while preventing interference with the rotation track R of the front fork 4.

Further, the hydraulic unit 50 is placed in such a manner that its center of gravity is located within the placement space which is inward relative to a virtual line X extending in the forward and rearward direction along the outer edge of the maximum-space portion 9a of the main frame 9. In the example of FIG. 2, the whole of the hydraulic unit 50 is substantially placed within the placement space A. In other words, the hydraulic unit 50, except a portion of an outer member, is placed within the placement space A. This layout can also make it difficult for an outside impact to be transmitted to the hydraulic unit 50. Further, preferably, the whole of the hydraulic unit 50 is substantially placed within the placement space A.

The hydraulic unit 50 includes connection ports 53 by which hydraulic pipes (front wheel hydraulic pipes and rear wheel hydraulic pipes) are connected to the hydraulic unit 50. Four connection ports 53 are provided to connect four hydraulic pipes to the hydraulic unit 50. At least one of these connection ports 53 is preferably located within the placement space A. In the present embodiment, the four connection ports 53 are located within the placement space A. In accordance with this configuration, entrances and exits of the hydraulic oil in the hydraulic unit 50 are located inward in the vehicle width direction relative to the maximum-space portion 9a of the main frame 9. This layout makes it difficult for an outside impact to be applied to the connection ports 53 of the hydraulic unit 50.

The connection ports 53 are provided on the upper surface of the hydraulic unit 50. This makes it easier to lay out the hydraulic pipes in the forward and rearward direction, while placing the four hydraulic pipes on a common surface.

In a case where portions connected to the connection ports 53, respectively, of the hydraulic pipes connected to the connection ports 53, are constituted by metal pipes, respectively, these metal pipe portions are also placed within the placement space A in a preferable configuration. The whole of the hydraulic pipes are preferably located inward in the vehicle width direction relative to the virtual line X.

As shown in FIGS. 2 and 3, among the four hydraulic pipes connected to the hydraulic unit 50, two hydraulic pipes constituting the rear hydraulic pipes are placed to extend from outside one of the pair of right and left main frames 9 into the space formed between the pair of right and left main frames 9, through the above-described through-holes. More specifically, the two hydraulic pipes constituting the rear hydraulic pipes are introduced into the space formed between the pair of right and left main frames 9, through the through-holes defined by the first frame 921 and the second frame 922 of the lower frame 92 and the gusset frame 93 connecting the first frame 921 and the second frame 922 to each other.

In the interior of the space formed between the pair of right and left main frames 9, the two hydraulic pipes introduced into this space extend rearward through this space and are connected to the rear wheel brake master cylinder and the rear wheel brake caliper 38B, respectively.

In accordance with the above-described configuration, the hydraulic pipes are introduced into the space formed between the main frames 9 and thereby protected. In addition, since it is not necessary to place the hydraulic pipes above or below the main frames 9, the hydraulic pipes can be shortened, and a degree with which the hydraulic pipes are curved can be reduced. This makes it easier to perform a hydraulic control appropriately and increase a reaction speed in the hydraulic control.

Although in the present embodiment, the hydraulic pipes extend into the space formed between the first frame 921 and the second frame 922 of the lower frame 92, the hydraulic pipes may extend into a space formed between the upper frame 91 and the lower frame 92 (the first frame 921 of the lower frame 92).

The connection ports 53 are placed above the upper surface of the first frame 921, which will be described later. This makes it possible to prevent interference between the first frame 921 and the hydraulic pipes, and easily place the rear hydraulic pipes at a location that is rearward relative to the hydraulic unit 50.

As shown in FIG. 3, when viewed from above, the hydraulic unit 50 is placed to overlap with the handle 6 while the vehicle is traveling straight ahead. The hydraulic unit 50 is placed below the handle 6 to be spaced apart from the handle 6. More specifically, the hydraulic unit 50 is placed in such a manner that the upper surface (including the connection ports 53 in the example of FIG. 3) of the hydraulic unit 50 is located below the upper frame 91.

In accordance with the above-described configuration, the hydraulic unit 50 can be placed close to the head pipe 5, without impeding the rotation of the handle 6. This allows the hydraulic unit 50 to be located to be as close to the center of the vehicle body of the motorcycle 1 in the vehicle width direction as possible. Further, in a sport bike or the like which is provided with the handle 6 at a relatively low position, it becomes possible to prevent interference between the hydraulic unit 50 and the handle 6.

Further, when viewed from the side, the hydraulic unit 50 is placed to overlap with the head pipe 5 in the forward and rearward direction.

The hydraulic unit 50 is located above the radiator 32 which cools the coolant. The radiator 32 is placed rearward relative to the front wheel 2 and in front of the engine E. Since the hydraulic unit 50 is placed while avoiding interference with the radiator 32 in the forward and rearward direction, the hydraulic unit 50 is less affected by heat generated in the radiator 32. Further, a heat insulating cover (not shown) may be provided between the hydraulic unit 50 and the radiator 32. This makes it possible to prevent the heat radiated from the radiator 32 from being transmitted in an upward direction toward the hydraulic unit 50, while the motorcycle 1 is not traveling, for example, idling.

The radiator 32 includes on an upper portion thereof a radiator cap 32A for closing an opening through which the additional coolant is supplied to the radiator 32. The hydraulic unit 50 is placed to be apart from the radiator cap 32A, specifically, rearward relative to the radiator cap 32A. In this layout, interference between the hydraulic unit 50 and the radiator cap 32A does not take place. As a result, for example, the additional coolant can be more easily supplied to the radiator 32, and the hydraulic unit 50 can be more easily replaced.

Figure 5:
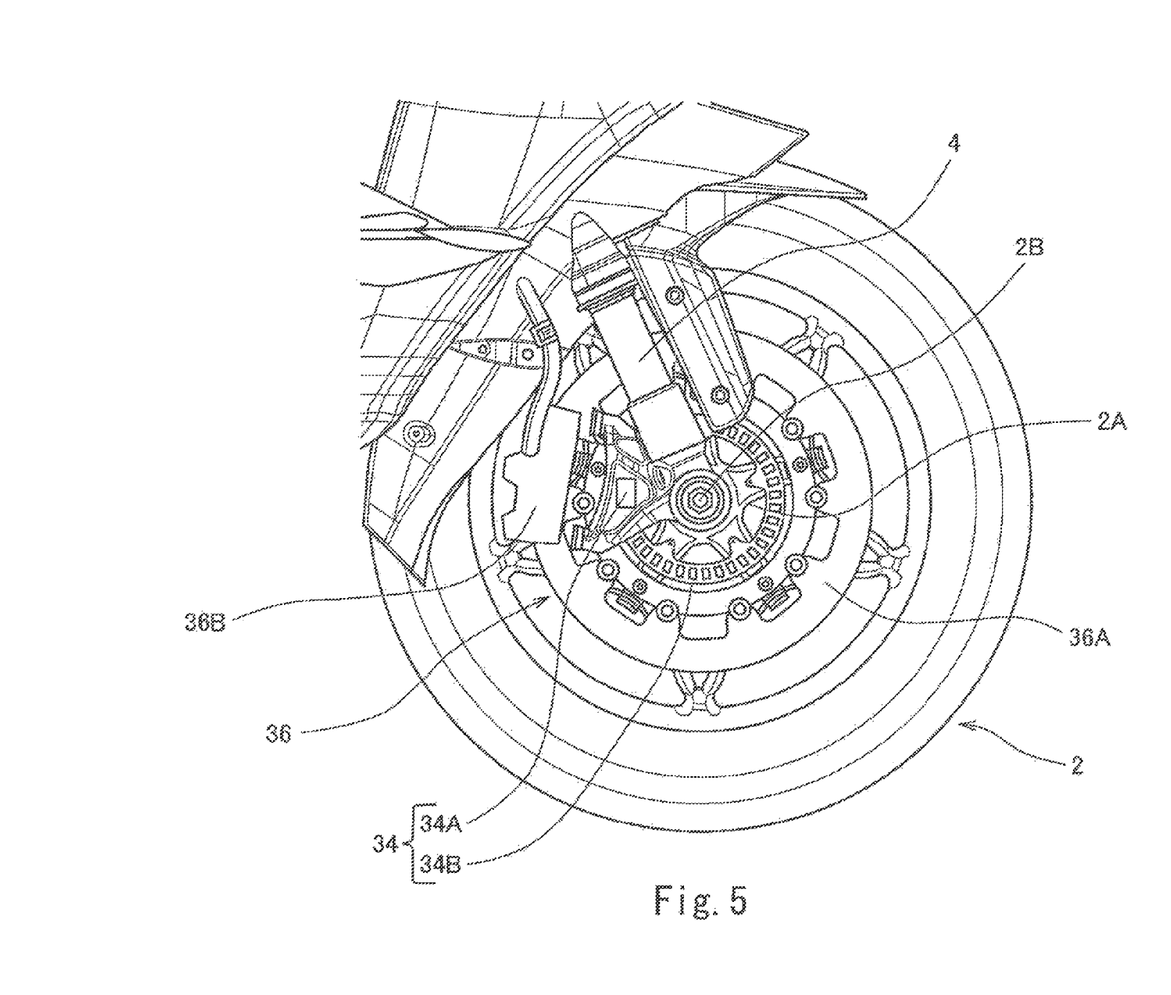
FIG. 5 is a partial side view showing a region which is in the vicinity of a front wheel of the motorcycle according to the embodiment.

Now, the front wheel brake 36 of the present embodiment will be described. FIG. 5 is a partial side view showing a region which is in the vicinity of the front wheel of the motorcycle according to the embodiment. As shown in FIG. 5, the front wheel brake disc 36A is fastened to a wheel member 2A constituting the front wheel 2 in such a manner that the front wheel brake disc 36A is unrotatable with respect to the wheel member 2A. A front wheel vehicle speed sensor unit 34 includes a vehicle speed sensor body 34A fastened to the vehicle body (front fork 4) to which the front wheel 2 is rotatably mounted, and a vehicle speed sensor rotor plate 34B fastened to the wheel member 2A in such a manner that the vehicle speed sensor rotor plate 34B is unrotatable with respect to the wheel member 2A. The front wheel vehicle speed sensor unit 34 is configured as, for example, a rotary encoder.

The front wheel brake disc 36A and the vehicle speed sensor rotor plate 34B are placed to be radially spaced apart from each other over the entire circumference of the rotary shaft (front wheel axle) 2B of the front wheel. More specifically, the front wheel brake disc 36A and the vehicle speed sensor rotor plate 34B are placed coaxially with the front wheel axle 2B. Further, the inner diameter of the front wheel brake disc 36A is set to be greater than the outer diameter of the vehicle speed sensor rotor plate 34B. The wheel member 2A is made of a material different from that of the front wheel brake disc 36A and the vehicle speed sensor rotor plate 34B which are made of, for example, aluminum alloy. More specifically, the wheel member 2A is made of a material with a heat conductivity which is higher than that of the front wheel brake disc 36A and the vehicle speed sensor rotor plate 34B. In other words, the front wheel brake disc 36A and the vehicle speed sensor rotor plate 34B are connected to each other via the wheel member 2A with a higher heat conductivity. The front wheel brake disc 36A and the vehicle speed sensor rotor plate 34B are fastened to the wheel member 2A directly or via a boss member (not shown) fastened to the wheel member 2A.

In accordance with the above-described configuration, the front wheel brake disc 36A and the vehicle speed sensor rotor plate 34B are not in direct contact with each other. Therefore, friction heat generated in the front wheel brake disc 36A is released from the wheel member 2A.

The above-described configuration makes it difficult for the friction heat generated in the front wheel brake disc 36A to be transferred to the vehicle speed sensor rotor plate 34B. Therefore, it becomes possible to prevent expansion or distortion of the vehicle speed sensor rotor plate 34B which measures the front wheel vehicle speed, due to the heat. As a result, low accuracy of measurement of the vehicle speed, which may be caused by the heat, does not take place.

Although in the present embodiment, the front wheel brake disc 36A and the front wheel vehicle speed sensor unit 34 which are mounted to the front wheel 2 have been described above, a configuration similar to the above may be used in the rear wheel brake disc 38A and a rear wheel vehicle speed sensor unit which are mounted to the rear wheel 3.

The embodiment of the present invention has been described above. The present invention is not limited to the above-described embodiment. The present invention may be improved, changed or modified within a scope of the spirit of the invention.

For example, in the present embodiment, the hydraulic unit 50 is configured as a unit for the electric brake device which performs the anti-lock operation and the combined braking operation. However, the present invention is not limited to this. For example, the hydraulic unit may be configured as a unit which performs only one of the anti-lock operation and the combined braking operation. Further, for example, the hydraulic unit 50 may be configured as a unit which hydraulically controls a brake pressure required for braking control, such as a traction control, or a wheelie prevention control. In the present embodiment, the hydraulic unit 50 is configured as a unit which assists the braking control for both of the front wheel 2 and the rear wheel 3. However, the present invention is not limited to this. For example, the hydraulic unit 50 may be configured as a unit which assists the braking control for one of the front wheel 2 and the rear wheel 3.

INDUSTRIAL APPLICABILITY

The present invention can provide a space inside main frames to place other members therein, and make it difficult for an outside impact to be transmitted to a hydraulic unit, in a motorcycle including the hydraulic unit which performs a hydraulic control operation such as an anti-lock operation or a combined braking operation.

REFERENCE CHARACTERS LIST 1 motorcycle
2 front wheel
4 front fork
5 head pipe
6 handle
9 main frame
9a maximum-space portion
9b increased-space portion
32 Radiator
34 front wheel vehicle speed sensor unit
34A vehicle speed sensor body
34B vehicle speed sensor rotor plate
36A front wheel brake disc
50 hydraulic unit
53 connection port

The invention claimed is:

1. A motorcycle comprising:
a head pipe which supports a rotary shaft around which a handle is rotatable with respect to a vehicle body in such a manner that the rotary shaft is rotatable;
a pair of right and left main frames extending in a forward and rearward direction from the head pipe; and
a hydraulic unit mounted to one of the pair of right and left main frames,
wherein the pair of right and left main frames have increased-space portions, which define a space with a dimension increasing in an obliquely rearward direction from the head pipe toward maximum-space portions of the main frames, which define a space with a greatest dimension,
wherein the hydraulic unit is mounted to an outer portion of the increased-space portion of one of the main frames, and
wherein the hydraulic unit is placed in such a manner that a whole of the hydraulic unit or a center of gravity of the hydraulic unit is located in a placement space that is inward relative to a virtual line extending in the forward and rearward direction along an outer edge of one of the maximum-space portions.

2. The motorcycle according to claim 1,
wherein the hydraulic unit is placed in the increased-space portion and located radially outward relative to a rotation track of a front fork placed between the handle and a front wheel, around the rotary shaft.

3. The motorcycle according to claim 2,
wherein a portion of an inner side surface of the hydraulic unit in a vehicle width direction is located inward in the vehicle width direction relative to an outermost end in the vehicle width direction, of the rotation track of the front fork around the rotary shaft.

4. The motorcycle according to claim 1,
wherein at least one of the pair of right and left main frames is provided with a through-hole extending in a vehicle width direction, and
wherein a hydraulic pipe connected to the hydraulic unit is placed to extend from outside one of the pair of right and left main frames into a space formed between the pair of right and left main frames, through the through-hole.

5. The motorcycle according to claim 1, comprising:
a radiator which cools a coolant,
wherein the hydraulic unit is located above the radiator.

6. The motorcycle according to claim 1, comprising:
a brake disc which is fastened to a wheel member constituting a wheel in such a manner that the brake disc is unrotatable with respect to the wheel member; and
a vehicle speed sensor unit which detects a speed of the wheel and transmits the detected speed to the hydraulic unit,
wherein the hydraulic unit is configured to control a braking force based on a signal received from the vehicle speed sensor unit,
wherein the vehicle speed sensor unit includes:
a vehicle speed sensor body fastened to the vehicle body to which the wheel is rotatably mounted, and
a vehicle speed sensor rotor plate which is fastened to the wheel member in such a manner that the vehicle speed sensor rotor plate is unrotatable with respect to the wheel member; and
wherein the brake disc and the vehicle speed sensor rotor plate are placed to be radially spaced apart from each other over an entire circumference of the rotary shaft of the wheel.

7. The motorcycle according to claim 1,
wherein an outer side surface of the hydraulic unit in a vehicle width direction is inclined with respect to the forward and rearward direction in such a manner that the outer side surface extends in an inward direction of the vehicle width direction as the outer side surface extends in a forward direction.

8. A motorcycle comprising:
a head pipe which supports a rotary shaft around which a handle is rotatable with respect to a vehicle body in such a manner that the rotary shaft is rotatable;

a pair of right and left main frames extending in a forward and rearward direction from the head pipe; and a hydraulic unit mounted to one of the pair of right and left main frames, wherein the pair of right and left main frames have increased-space portions, which define a space with a dimension increasing in an obliquely rearward direction from the head pipe toward maximum-space portions of the main frames, which define a space with a greatest dimension, wherein the hydraulic unit is mounted to an outer portion of the increased-space portion of one of the main frames, wherein the hydraulic unit includes a connection port connecting a hydraulic pipe to the hydraulic unit, and wherein the connection port is placed in such a manner that the connection port is located in a placement space that is inward relative to a virtual line extending in the forward and rearward direction along an outer edge of one of the maximum-space portions.

9. A motorcycle comprising:

a head pipe which supports a rotary shaft around which a handle is rotatable with respect to a vehicle body in such a manner that the rotary shaft is rotatable;

a pair of right and left main frames extending in a forward and rearward direction from the head pipe; and a hydraulic unit mounted to one of the pair of right and left main frames, wherein the pair of right and left main frames have increased-space portions, which define a space with a dimension increasing in an obliquely rearward direction from the head pipe toward maximum-space portions of the main frames, which define a space with a greatest dimension, wherein the hydraulic unit is mounted to an outer portion of the increased-space portion of one of the main frames, and wherein when viewed from above, the hydraulic unit is placed to overlap with the handle while the motorcycle is traveling straight ahead, and is placed below the handle to be spaced apart from the handle.

* * * * *